United States Patent [19]
Herzog

[11] 3,906,243
[45] Sept. 16, 1975

[54] RETROFIT EMERGENCY LIGHTING SYSTEM

[75] Inventor: Rollie R. Herzog, Burnt Hills, N.Y.

[73] Assignee: Construction Materials Division, General Electric Company, Indianapolis, Ind.

[22] Filed: Nov. 14, 1973

[21] Appl. No.: 415,653

[52] U.S. Cl. .................. 307/66; 315/86; 315/105; 336/69; 336/160; 336/183
[51] Int. Cl.² ................. H02J 9/00; H05B 41/14
[58] Field of Search ................. 317/14, 15, 18 D; 315/DIG. 5, DIG. 7, 86, 105; 307/17, 66, 157; 336/69, 70, 160, 165, 183

[56] References Cited
UNITED STATES PATENTS

| | | | |
|---|---|---|---|
| 2,356,558 | 8/1944 | Bähring | 336/183 |
| 3,089,980 | 5/1963 | Neusbaum | 315/105 |
| 3,116,437 | 12/1963 | Harvey | 317/15 |
| 3,209,241 | 9/1965 | Book et al. | 317/14 R |
| 3,596,135 | 7/1971 | Stenger et al. | 317/15 |
| 3,684,891 | 8/1972 | Sieron | 315/86 |

Primary Examiner—William H. Beha, Jr.

[57] ABSTRACT

A retrofit emergency lighting system including a 60Hz AC ballast for operating at least one gaseous discharge lamp. There is provided a means for substantially electrically isolating the secondary side of the ballast transformer from ground thereby reducing the hazard of electrical shock during lamp replacement. The ballast transformer is an isolation transformer having the secondary winding connected across the lamp. A pair of filament windings are connected to the filaments of the lamp and are positioned laterally with respect to the primary winding and in a pancake form so as to provide low capacitance between the filament windings and primary winding. An inverter circuit, which is driven by a DC battery, is further connected across the lamp for operating the lamp during emergency conditions. The inverter circuit operates at such a frequency so as to minimize capacitive leakage and inductive shunt current losses.

1 Claim, 6 Drawing Figures

PATENTED SEP 16 1975       3,906,243

RETROFIT EMERGENCY LIGHTING SYSTEM

BACKGROUND OF THE INVENTION

The present invention relates to a retrofit emergency lighting system including an AC ballast and an inverter for operating at least one gaseous discharge lamp during normal and emergency conditions. More particularly, it relates to a means for providing electrical isolation between the circuit components on the secondary side of the ballast transformer and ground so as to reduce the hazard of electrical shock and further reduce power losses during the normal mode and especially during the emergency mode of operation.

Gaseous discharge lamps, for example fluorescent lamps, have a negative resistance characteristic. That is, as the current in the lamp begins to rise, the voltage across the lamp begins to fall causing more and more current to be drawn and eventually destroying the lamp. Various types of inductive and capacitive devices have been used to limit this current and thus ballast the lamp. These lamps usually operate from a 60Hz AC power source during the normal mode of operation. There have further been provided emergency lighting systems which utilize inverter circuits driven by a DC battery. The inverter is connected across the lamp and it operates the lamp at a high frequency level, e.g. 6KHz. Because ballast and emergency lighting systems are AC devices, there are current losses because of capacitive leakage current and inductive shunts to ground. That is, the various transformer windings, wires, etc. are connected in a spaced relationship with a part of the ballast case, which is grounded. This spaced relationship forms a capacitance and an alternating current may flow through this capacitance. If the frequency of lamp operation is high, e.g. 6KHz which might occur during the emergency mode, the impedance of this stray capacitance is low resulting in high capacitance leakage currents.

Fluorescent lamps, ballasts, and emergency lighting systems may be mounted in fixtures which are grounded as shown in FIG. 5. When the fluorescent lamp 5 burns out and must be replaced by a serviceman, there is a possibility that the serviceman could receive an electrical shock because of improper electrical isolation in the ballast. If the serviceman should happen to touch the fixture 1 of FIG. 5, which is grounded as indicated by ground symbol 2, and at the same time touch either terminal 3 or 4 of fluorescent lamp 5 while the other terminal remains connected in the fixture, he could receive an electrical shock because of this poor isolation. This could happen during either the normal mode of operation or the emergency mode of operation. Because of the relatively low impedance of the stray capacitance at high frequencies, the possibility of electrical shock is greater during the emergency mode. Also during the emergency mode the inverter is used to instant start the lamp at a relatively high voltage (700 volts peak for a 40 watt fluorescent lamp), whereas during the normal 60Hz mode the lamp is rapid started at a relatively low voltage (300 volts peak).

In the past there have been provided interrupt lampholders of a type well known in the art, to be connected to the terminals of the fluorescent lamp. These interrupt lampholders are useful in that the primary or secondary circuit of the ballast may be opened when the fluorescent lamp is to be replaced. However, in retrofitting existing lighting fixtures to provide an emergency mode of operation it is undesirable to use interrupt lampholders because certain fixtures are of the size and shape which will not accept the interrupt lampholder. Furthermore, the interrupt lampholders are sometimes unreliable and are an added cost to a retrofit system. It is, therefore, desirable to lessen the hazard of electrical shock which may occur especially while the high frequency inverter is in operation and the lamp is operated in the emergency mode without using interrupt lampholders.

In many prior ballast circuits the filament windings used to provide filament heat for the lamp during normal operations were wound over at least a portion of the primary winding. A large stray capacitance therefore existed and the leakage current through this capacitance was accentuated by the use of a high frequency inverter to drive the lamp. This added to the electrical shock hazard and furthermore detracted from the circuit efficiency.

OBJECTS OF THE INVENTION

Accordingly one of the objects of this invention is to provide an improved retrofit ballast and emergency lighting system for operating at least one gaseous discharge lamp.

Another object of this invention is to provide a ballast and emergency lighting system for operating at least one gaseous discharge lamp utilizing an inverter which operates at a predetermined frequency which minimizes capacitance leakage currents and inductive current shunts during the emergency mode.

Another object is to provide a retrofit ballast and emergency lighting system whereby the electrical shock hazard especially during lamp replacement is substantially lessened.

Another object is to provide a ballast and emergency lighting system wherein the capacitance to ground of the ballast is substantially low.

Another object is to provide a ballast and emergency lighting system wherein the secondary side of the ballast isolation transformer is substantially isolated from ground.

SUMMARY OF THE INVENTION

In accordance with one form of this invention there is provided a ballast and an emergency lighting system for operating at least one gaseous discharge lamp including input terminals for connecting the ballast to a source of AC power. A ballasting isolation transformer having primary and secondary windings is further provided. The primary winding is connected across the input terminals and one side of the primary winding is adapted to be connected to ground. The secondary winding is connected across the at least one gaseous discharge lamp. A pair of filament windings are provided for preheating the lamp. The filament windings are associated with the primary winding, however, the effective capacitance between the filament and primary windings is substantially low. The emergency lighting system includes a means for operating the lamp at a frequency substantially higher than normal AC in the absence of normal AC power.

BRIEF DESCRIPTION OF THE DRAWINGS

The subject matter which is regarded as the invention is set forth in the appended claims. The invention itself, however, together with further objects and advantages thereof may be better understood by reference to the following description taken in conjunction with the accompanying drawings in which:

DESCRIPTION OF THE PREFERRED EMBODIMENT

Figure 1:
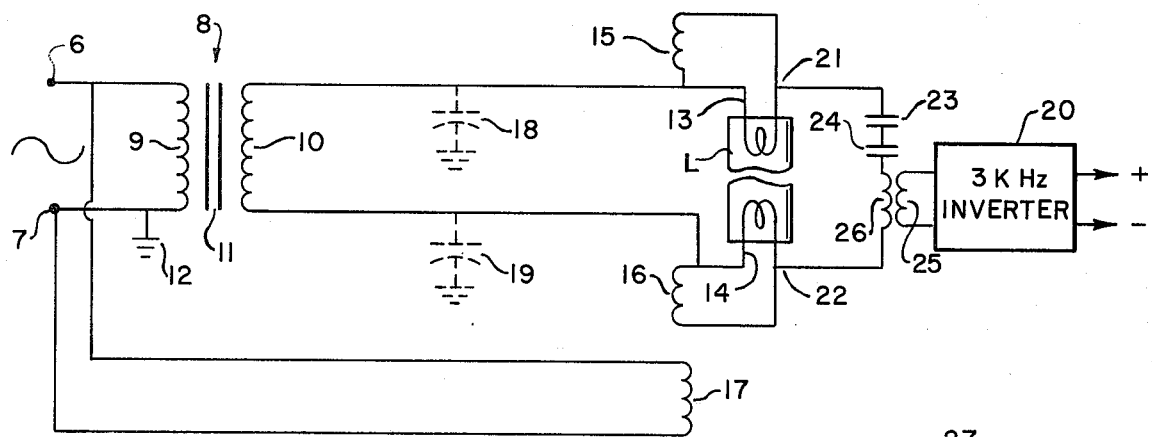
FIG. 1 is a schematic circuit diagram of an AC ballast for operating the lamp during normal operation and an inverter circuit for operating the lamp during the emergency mode.
Figure 6:
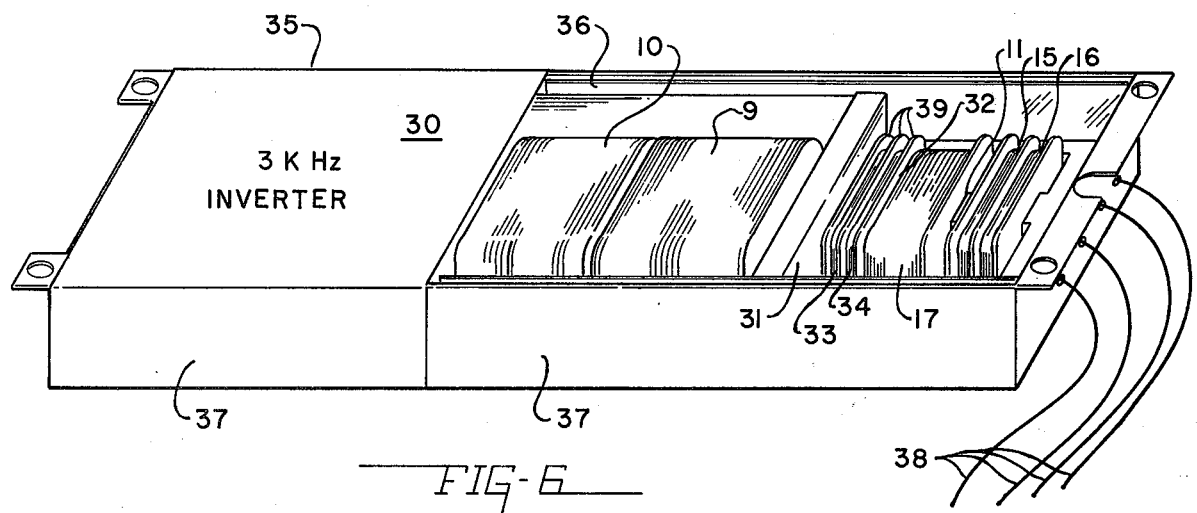
FIG. 6 is a perspective view partially cut away showing the transformer arrangement of the retrofit normal ballast and emergency inverter.

Referring now to FIG. 1, there are provided input terminals 6 and 7 adapted to receive AC power for normal lamp operation. There is further provided a ballasting isolation transformer 8 including main primary winding 9, secondary winding 10 and core 11 exhibiting relatively high leakage reactance. One side of main primary winding 9 is adapted to be connected to ground as indicated by symbol 12. Input terminals 6 and 7 are further connected across main primary winding 9 for energizing the transformer. Secondary winding 10 of ballasting isolation transformer 8 is magnetically coupled to the primary winding 9 but it is not directly electrically coupled to the primary winding as is done in the case of an autotransformer which is the most usual type of transformer ballast. Secondary winding 10 is further connected across gaseous discharge lamp L by its connection to lamp filaments 13 and 14. Filament windings 15 and 16 are respectively connected to filaments 13 and 14 to provide preheating for the filaments of the lamp during normal AC operation. This preheating allows the lamp to be rapid started, utilizing about 300 volts peak. The filament windings may be magnetically energized by second primary winding 17, as shown in this embodiment, or by the main primary winding 9. Furthermore, the main and second primary and the filament windings may be mounted on the same core or the second primary and the filament windings may be mounted on a core separate from the main primary, as shown in FIG. 6.

A second primary winding 17, which is further connected across input terminals 6 and 7, is magnetically coupled to filament winding 15 and 16 for providing the energy for the preheating. However, the stray capacitance which is normally associated with the second primary 17 and the filament windings 15 and 16 is made substantially low, that is, the value of stray capacitance, indicated for purposes of explanation at 18 and 19, is relatively low thus substantially isolating the filament windings and the lamp filaments from ground. The means for providing this low stray capacitance will be explained in reference to FIGS. 3 through 6.

On the other side of the lamp L there is provided a circuit for operating the lamp in absence of normal AC power which is the emergency mode. This particular embodiment includes a circuit having a 3KHz inverter of a type well known to those skilled in the art, connected across lamp L at points 21 and 22. This inverter circuit 20 may operate at various frequency ranges, however, it has been found that the range which minimizes both capacitive leakage current and inductive shunt current is between 2.5KHz and 4.0KHz. A frequency much lower than 2.5KHz will allow substantial shunt current losses through the transformer 8, however, operating at a frequency much higher than 4.0KHz will allow current losses through the indicated stray capacitance 18 and 19. In order to lower the inverter frequency range from 6KHz or above to the range of 2.5KHz–4KHz merely involves the substitution for certain components of differing values. The emergency mode circuit further includes capacitors 23 and 24, primary winding 25 and secondary winding 26. A description and operation of the emergency mode is more fully explained in an application (Ser. No. 256,252) now U.S. Pat. No. 3,836,815, invented by Rollie R. Herzog and assigned to the General Electric Company, assignee of the present invention.

Figure 2:
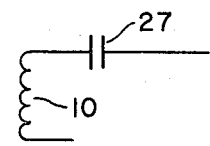
FIG. 2 is a portion of a schematic circuit diagram showing a power capacitor which may be included in the circuit of FIG. 1.

FIG. 2 shows the secondary winding 10 of the transformer 8 included in FIG. 1. Secondary winding 10 has one side connected to power capacitance 27. The use of power capacitance 27 would convert the purely lagging circuit of FIG. 1 to a partially leading circuit. If a power capacitance is used its general outer structure may be that which is shown in FIG. 3.

Figure 3:
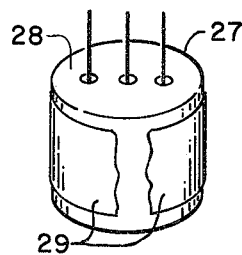
FIG. 3 is a perspective view of the capacitor of FIG. 2.

FIG. 3 shows a capacitor 27 housed in a can 28 made of metal. To prevent this metal can from providing a high capacitance to the ballast case which is grounded, an insulation material 29 may be used. This insulation material 29 is shown wrapped around part of the capacitor can 28. The insulation material, in this particular embodiment, is polyester, however, other insulation systems may be used having relatively low effective dielectric constant, and being mechanically flexible enough to be wrapped around the capacitor can.

Figure 4:
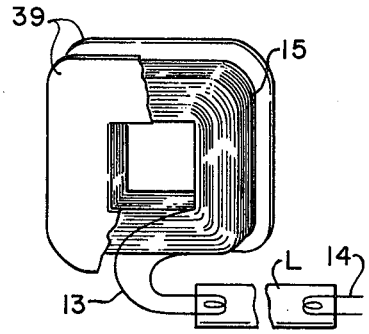
FIG. 4 is a perspective view of one of the filament windings of FIG. 1 connected to the lamp.
Figure 5:
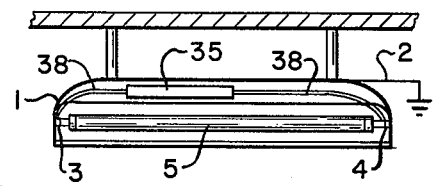
FIG. 5 is a side view with one side cut away showing a ballast and fluorescent lamp mounted in a fixture.

FIG. 4 shows filament winding 15 connected to filament 13 of gaseous discharge lamp L. There is a similar filament winding connected to filament 14 but is not shown because of redundancy. Filament winding 15, in this embodiment, is wound as a narrow pancake type winding. This winding may be only a single winding turn wide or many turns wide. Insulation partition 39, shown partially cut away, is provided on both sides of the filament winding 15 for electrical insulation. In this embodiment the partitions are made of nylon, however, other materials with high electrical insulation qualities may be used such as polypropylene.

Another difference between this type of filament winding and the prior art is that this filament winding is mounted laterally spaced apart from the second primary winding. This will be more readily apparent in reference to FIG. 6.

FIG. 6 is a perspective view of the enclosure 35 housing the emergency mode inverter and normal ballast wherein the normal ballast section of the enclosure is cut away. The 3KHz inverter circuit is indicated as inside an enclosed portion 30 and the normal ballast is indicated in the open portion 31. Main primary winding 9 and secondary winding 10 are wound about core 11, and are mounted laterally from one another and are slightly spaced apart for electrical isolation. Second primary winding 17 and filament windings 15 and 16 are mounted on core 32. The filament windings 15 and 16 are wound in a pancake form in this embodiment as shown in FIG. 4, however they may be wound in other geometric forms. All of the above windings may be be mounted on a common core, and furthermore, a single primary winding may used. These filament windings are further mounted in a lateral spaced relationship to second primary winding 17.

In the past the filament windings have been mounted over the second primary winding 17, however, this type of arrangement caused a relatively high capacitance between the filament windings and this primary winding. By mounting the filament windings 15 and 16 laterally to the primary winding 17 a relatively low effective capacitance is established and better electrical isolation is achieved between the filament windings and the primary windings. Insulation partitions 39 are attached to both sides of filament windings to further provide electrical isolation. Charging winding 33 and bias winding 34 are further mounted on transformer core 32 in a lateral spaced relationship to the primary 17. The charging winding is used to charge a battery (not shown) which provides power for the lamp during the emergency mode. The bias winding is used to hold off the inverter while the normal AC power is available. Insulation partitions 39 are also attached on both sides of the charging, bias, and second primary windings. A more complete description of the charging and bias windings and their respective circuits may be found in an application (Ser. No. 256,252) invented by Rollie R. Herzog and assigned to General Electric Company, assignee of the present invention.

There is further provided an insulation between electrical components of the ballast and the case 35. This insulation is indicated at 36 and is inserted all around the sides 37 of the case 35. This further provides electrical insulation, that is, a low capacitance between the electrical components of the ballast and the case which is grounded. This insulation may be made of polyester, however, it may be made of other types of insulation having a relatively low dielectric constant.

A plurality of leads 38 is shown extending from housing 35. While only four leads are shown for convenience, there are in this embodiment in reality eleven leads. These leads are connected at one end to various electrical components in housing 35 and the other ends are connected to the lamp L, the battery (not shown) and other connections. These leads should be of a minimum length for performing their electrical connecting functions so as to further minimize stray capacitance.

Capacitor 27 of FIGS. 2 and 3 may be housed in enclosure 35 by providing adequate space. This would convert the ballast from a pure lag circuit to a switch lead circuit.

Referring again to FIG. 5, there is shown a side cut away view of a lighting fixture containing fluorescent lamp 5 having terminals 3 and 4, and an enclosure 35 (which may include the retrofit emergency lighting system and an AC ballast), connected in a channel above the fluorescent lamp 5. A plurality of leads indicated at 38 are used to connect the ballast to the terminals of the fluorescent fixture and possibly to a battery for driving the inverter circuit. These leads are shown to be as short as possible to reduce the stray capacitance to ground. That is, they should be made to fit fairly tightly between their connecting point at the lamp terminal, the battery, or other connections and the ballast case.

By providing a ballast with the insulation and isolation as described, the total capacitance between the internal wiring and components on the secondary winding side of the ballast and ground (case) has been measured to be as low as 300 pfd. For a 40W fluorescent lamp operated in the emergency mode with the inverter output at approximately 3KHz, currents as low as 3 ma have been measured from the filament of the lamp to ground for normal human contact. That is, with one hand on the lamp terminal, which is connected to a lamp filament, and the other hand on the ballast case or lighting fixture the current flow was near 3 ma which means that the impedance provided by the low stray capacitance and isolation is substantially high. This high frequency current level is not dangerous and should not be enough to startle a serviceman replacing a lamp. Without the substantial electrical isolation recited, the serviceman could receive a substantial electrical shock while replacing a lamp. If he simultaneously touched the lighting fixture, which is normally grounded, and one end of a lamp whose other end remained connected to the circuit, he could complete a circuit back to the grounded side of the primary winding. This could happen either in the normal or emergency mode of operation but would be more likely in the emergency mode because of the higher frequency of operation.

The circuit shown in FIG. 1 has been built and operated with components having the following set of values:

Main Primary Winding 9 — 972 turns, 0.026 inch wire
Secondary Winding 10 — 2238 turns, 0.0113 inch wire
Second Primary Winding 17 — 1512 turns, 0.008 inch wire
Filament Winding 15 — 57 turns, 0.0179 inch wire
Filament Winding 16 — 57 turns, 0.0179 inch wire
Inverter Primary Winding 25 — 32 turns, 0.0201 inch wire
Inverter Secondary Winding 26 — 806 turns, 0.0089 inch wire
Capacitor 23 — 0.0075 ufd.
Capacitor 24 — 0.0075 ufd.
Lamp L — 40W fluorescent
Inverter 20 — 3KHz From the foregoing description of the embodiment of the invention, it will be apparent that many modifications may be made therein. For example, filament windings having physical designs other than pancake may be used as long as there is substantial effective capacitance isolation between the filament windings and the primary winding. It will be understood, therefore, that these embodiments of the invention are intended as an exemplification only and that this invention is not limited thereto. It is also understood, therefore, that it is intended in the appended claims to cover all modifications that fall within the true spirit and scope of this invention.

What I claim as new and desire to secure by Letters Patent of the U.S. is:

1. A ballast apparatus for operating at least one gaseous discharge lamp during normal and emergency modes comprising:
   a ballasting isolation transformer having a main primary winding and a secondary winding, one side of said main primary winding being connected to ground;

a pair of input terminals connected across said main primary winding for connection to a source of AC power;

a pair of filament windings wound in pancake form and arranged for connection to the at least one gaseous discharge lamp;

said secondary winding connected to said filament windings;

a second primary winding connected across said main primary winding, said second primary winding being magnetically coupled to said filament windings, said filament windings and said second primary winding being mounted laterally with respect to each other for providing a substantially low capacitance between said filament winding and said second primary winding;

a first electrical insulation means connected between said second primary winding and at least one of said filament windings;

an inverter circuit connected to said secondary winding for providing operating power during the emergency mode;

said inverter frequency being in the range of 2.5 KHz and 4.0 KHz for minimizing capacitive leakage current and inductive shunt current; said inverter circuit connected to a DC power source;

a case housing at least said inverter circuit, said main primary and secondary windings, said second primary winding, and said pair of filament windings;

a second electrical insulation means lining at least a part of said case;

a plurality of leads extending from said ballast case, said leads being of minimum length to make their connections so as to provide a substantially low stray capacitance.

* * * * *